(No Model.)

A. K. STILES.
FENCE POST.

No. 265,710. Patented Oct. 10, 1882.

WITNESSES:
A. W. Robertson
C. C. Leslie

INVENTOR
A. K. Stiles
By T. J. W. Robertson
ATTORNEY.

UNITED STATES PATENT OFFICE.

AARON K. STILES, OF CHICAGO, ILLINOIS.

FENCE-POST.

SPECIFICATION forming part of Letters Patent No. 265,710, dated October 10, 1882.

Application filed February 4, 1882. (No model.)

*To all whom it may concern:*

Be it known that I, A. K. STILES, of Chicago, in the county of Cook and State of Illinois, have invented new and useful Improvements in Combination Fence-Posts; and I do hereby declare that the following is a full, clear, and exact description thereof, reference being had to the accompanying drawings, which form a part of this specification.

The nature of this invention relates to certain new and useful improvements in the manufacture of iron fence-posts, which, while they may be adapted for all kinds of fences, are especially adapted to wire fences, either of the plain or of the barbed character; and the novelty consists in the construction, which will be more fully hereinafter set forth, and specifically pointed out in the claim.

Figure 1:
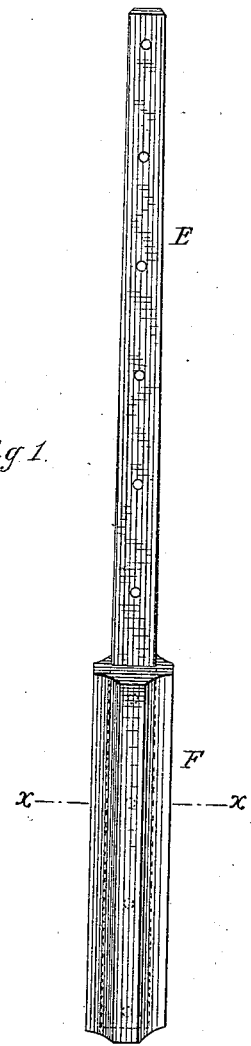
Figure 2:
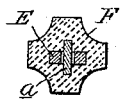

Figure 1 is a perspective view of my improved post, and Fig. 2 is a transverse section through the lines $x\ x$, Fig. 1.

In the accompanying drawings, E represents a flat or bar iron post, perforated in its exposed part to afford means of securing the wires which form the fence, while its lower or inclosed end is also perforated to receive the anchor-pins $a$, by means of which, when the cement base F is molded, the post is prevented from being withdrawn from the base. The anchor-pins $a$ are put in place and the plastic cement, or the like, cast or molded around the base of the post, after which it is allowed to dry or harden, when the post and base are securely held together for use. The cement is applied while in a plastic state and is hardened by exposure or heat. The form of the portion of the post which is inclosed in the plastic cement prevents its displacement after the base has become hard.

I am aware that it is not new with me to cast or mold a base around the lower end of a fence-post, and such construction is not sought to be covered broadly in this application. I am also aware that the ends of securing rods or braces have been bent to form a hook in the base for a similar purpose, but my invention relates entirely to a post consisting of a single stem.

What I claim as my invention is—

A perforated metal fence-post in combination with a cement base molded or cast around its lower end, and a series of pins passed transversely through the perforation in the post, so as to project from each side into the cement base, substantially as described.

AARON K. STILES.

Witnesses:
  WM. A. STILES,
  G. G. CALKINS.